United States Patent Office 3,424,507
Patented Jan. 28, 1969

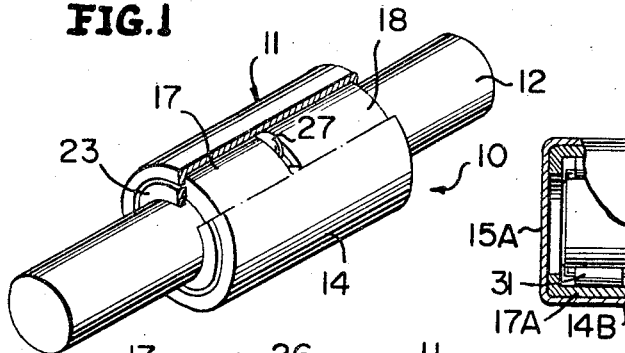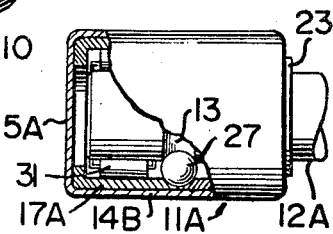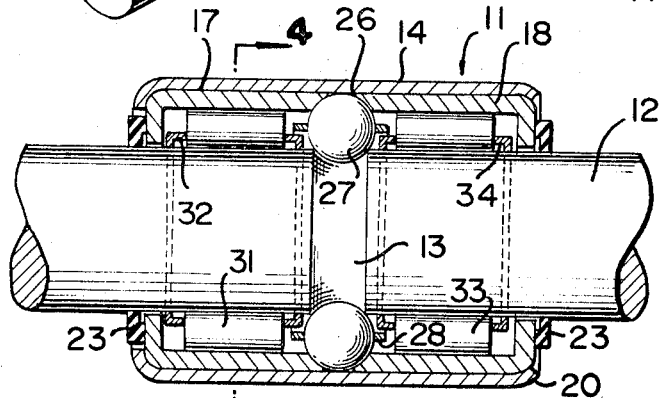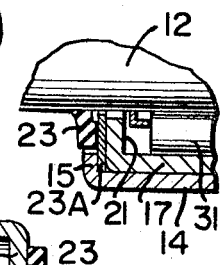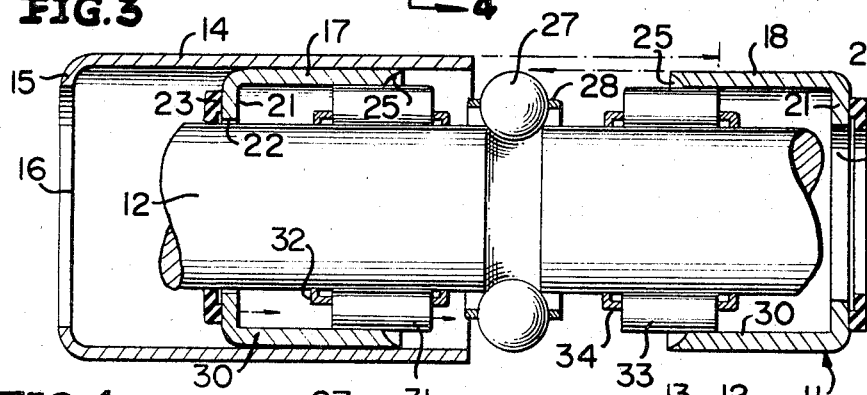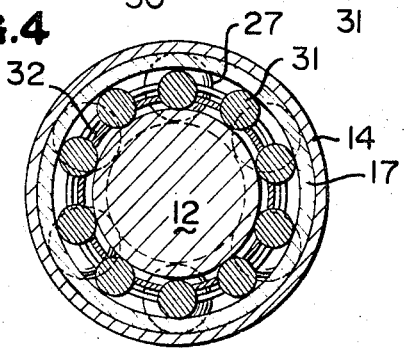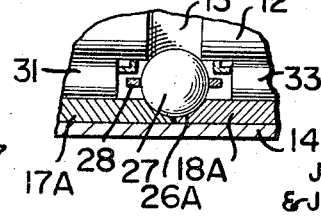
INVENTORS
JAMES W. ROLLINS
& JOHN J. MORONEY
BY Mason, Porter, Diller & Brown
ATTORNEYS

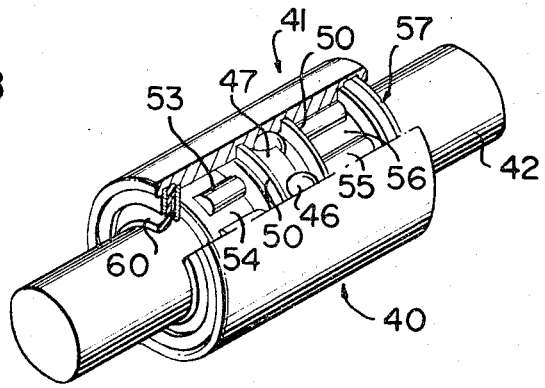
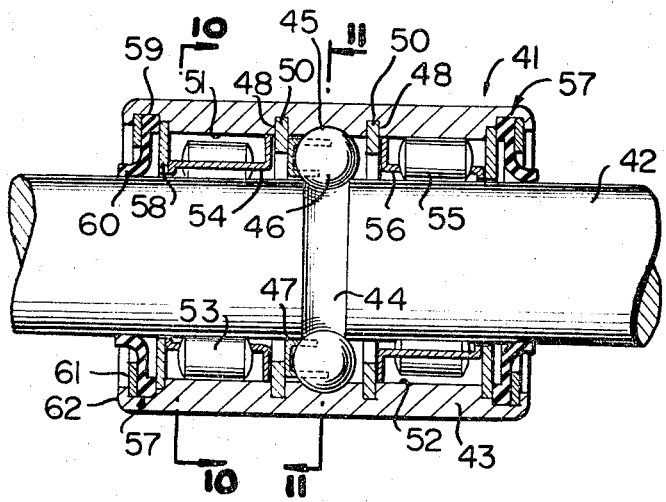
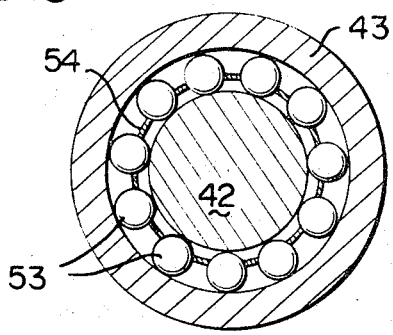
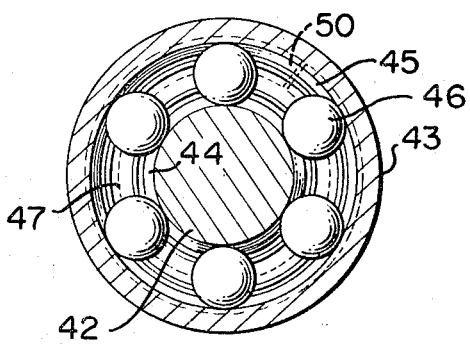

3,424,507
WATER PUMP BEARING
James W. Rollins, Winsted, and John J. Moroney, Torrington, Conn., assignors to The Torrington Company, Torrington, Conn., a corporation of Maine
Filed Aug. 2, 1966, Ser. No. 569,662
U.S. Cl. 308—174     8 Claims
Int. Cl. F16c 19/04, 19/10, 19/14

ABSTRACT OF THE DISCLOSURE

This disclosure particularly relates to a bearing and shaft assembly adapted for heavy radial or couple loads accompanied by a light axial thrust load. The bearing is one which is particularly adapted for use as a water pump bearing. The bearing includes a shaft which is mounted in a housing by means of two roller bearing assemblies for supporting the shaft under the radial loads, with there being an intermediate bearing assembly defined by groove-like raceways having balls seated therein, the balls providing for a relatively small radial load and at the same time acting as an axial thrust bearing. If desired, the housing may be economically formed of a sheet metal sleeve and two sheet metal cups, the cups cooperating to provide the necessary outer raceways and being retained in opposed end to end relation by the simple crimping of the opposite ends of the sleeve.

---

This invention relates in general to new and useful improvements in bearing and shaft assemblies, and more particularly to a novel bearing and shaft assembly particularly adapted for use in internal combustion engine water pumps.

During recent years internal combustion engines, particularly those designed for use in automobiles, have become larger and larger and more accessories are belt driven from water pump shafts. As a result, the water pump bearing requirements for such engines have become greater, thereby necessitating shaft and bearing assemblies which will withstand much greater loads. It is the primary object of this invention to provide such a shaft and bearing assembly.

Another object of this invention is to provide a novel shaft and bearing assembly which has sufficient capacity to be utilized in water pumps for automobile engines and at the same time is of a sufficiently small size so as to be incorporated in a water pump housing requiring a minimum of space.

Another object of this invention is to provide a novel shaft and bearing assembly which may be readily assembled and produced at a low cost so as to be economically feasible.

A further object of this invention is to provide a novel water pump bearing and shaft assembly wherein with the exception of the shaft and the rolling bearing elements, the various components thereof are formed of sheet metal and therefore, may be readily and economically mass produced.

With the above and other objects in view that will hereinafter appear, the nature of the invention will be more clearly understood by reference to the following detailed description, the appended claims and the several views illustrated in the accompanying drawings:

In the drawings:

FIGURE 1 is a perspective view of a shaft and bearing assembly formed in accordance with this invention, a portion of the housing thereof being broken away and shown in section in order to illustrate the details of construction thereof.

FIGURE 2 is an enlarged fragmentary longitudinal sectional view taken through the bearing of FIGURE 1 and shows the specific details of construction thereof.

FIGURE 3 is a sectional view similar to FIGURE 2 but with the parts of the bearing exploded in order to more clearly illustrate the structural details thereof in the manner in which they are assembled.

FIGURE 4 is a transverse sectional view taken along the line 4—4 of FIGURE 2.

FIGURE 5 is a fragmentary sectional view taken through the central portion of a modified form of shaft and bearing assembly.

FIGURE 6 is a fragmentary longitudinal sectional view taken through an end portion of the assembly showing another form of seal construction.

FIGURE 7 is an elevational view on a reduced scale with parts broken away and shown in section of a shaft and bearing assembly wherein one end of the shaft terminates within the bearing assembly.

FIGURE 8 is a perspective view of another form of shaft and bearing assembly with a portion of the housing broken away and shown in section in order to illustrate the details of the bearing.

FIGURE 9 is an enlarged longitudinal sectional view taken through the bearing of FIGURE 8 and shows the specific details of construction thereof.

FIGURE 10 is a transverse sectional view taken along the line 10—10 of FIGURE 9.

FIGURE 11 is a transverse sectional view taken along the line 11—11 of FIGURE 9.

Referring now to the drawings in detail, it will be seen that there is illustrated a bearing and shaft assembly formed in accordance with this invention which is generally referred to by the numeral 10. The bearing is generally referred to by the numeral 11, and the shaft is identified by the numeral 12.

Referring now to FIGURES 2 and 3, in particular, it will be seen that the shaft 12 is of a cylindrical construction except for the central portion thereof which is provided with a groove-like raceway 13. On the other hand, the bearing 11 is a multiple piece assembly which includes an outer sleeve 14 which is preferably of a drawn sheet metal construction and is preformed with an inturned flange 15 at one end thereof surrounding an opening 16. A first cup 17, which is preferably of a drawn sheet metal construction, is seated in the sleeve 14 and abuts against the flange 15 thereof. A second cup 18, which is identical with the cup 17, is also positioned in the sleeve 14 in opposed relation. It is to be noted that the cup 18 is spaced from the cup 17 and is retained in place by an inturned flange 20 formed on the sleeve 14 at the end opposite from the flange 15. The flange 20 is formed after the cups 17 and 18, and the other components of the bearing 11 are assembled within the sleeve 14.

It is to be noted that each of the cups 17 and 18 is provided at one end thereof with an inturned flange 21 having an opening 22 therethrough for the passage of the shaft 12. There is suitably secured to the outer face of each of the flanges 21 a shaft riding seal 23. The seals 23 serve to prevent the entrance of foreign matter into the bearing 11.

The free end of each of the cups 17 and 19 is shaped to define a contoured race surface 25. The race surfaces 25 may be formed in a press during the formation of the cups 17 and 18. It is to be noted that the race surfaces 25, which are spaced apart, cooperate generally with the sleeve 14 to define a groove-like raceway 26 which is aligned with the groove-like raceway 13. A plurality of rolling bearing elements 27 are seated in the aligned raceways 13 and 26. It is to be noted that the preferred embodiment of the bearing elements 27 are balls which are disposed in circumferentially spaced relation by means of a cage 28 which may be economically formed of sheet metal. Bearing elements 27 can be also in a full complement arrangement.

Each of the cups 17 and 18 has a cylindrical inner surface defining a cylindrical raceway 30. In the cup 17, there is disposed a second set of rolling bearing elements 31 which are preferaby in the form of rollers. The rollers 31 run on the shaft 12 and the raceway 30. The rollers 31 are preferably disposed in circumferentially spaced relation and are so retained by means of a cage 32 which may be economically formed of sheet metal. Rolling bearing elements 31 can be also in full complement arrangement.

A third set of roller bearing elements 33 is positioned between the shaft 12 and the cylindrical raceway 30 of the cup 18. The rolling bearing elements 33 are also preferably in the form of rollers which are circumferentially spaced and retained in such spaced relation by means of a cage 34 which may be economically formed of sheet metal, or in full complement arrangement.

It is clearly shown in FIGURE 3 how the bearing 11 is readily assembled. After the bearing cups 17 have been pressed into sleeve 14 with the rolling bearing elements 27, 31 and 33 properly positioned relative thereto, the assembly of components are locked together by crimping the end of the sleeve 14 to form the flange 20. Inasmuch as the principal components of the bearing 11, with the exception of the rolling bearing elements, are formed of sheet metal and may be readily and economically formed, and since the bearing 11 may be easily assembled with the shaft 12, it will be seen that the cost of manufacture of the bearing and shaft assembly 10 is an economically feasible one.

It is to be understood that the rollers 31 and 33 are of sufficient size to take the heavy radial loads imparted on the shaft 12. The balls 27 have the function of counteracting axial thrusts only on the shaft 12, which axial thrusts are relatively light compared to the radial bearing load.

The shaft and bearing assembly shown in FIGURE 2 is most economical. However, it is to be understood that it would be desirable if the raceway 26 were formed entirely within the cups 17 and 18. Reference is now made to FIGURE 5 wherein there are illustrated modified forms of cups which are identified by the numerals 17A and 18A. It is to be noted that the cups 17A and 18A are of sufficient thickness that the opposed ends thereof are disposed in abutting relation and the end portions are contoured to define a groove-like raceway 26A which is formed entirely within the cups 17A and 18A. The opposed ends of the cups 17A and 18A are held in contacting relation by the sleeve 14A which is of an internal diameter to snugly receive the cups. It is to be understood that the sleeve 14A prevents the separation of the cups and thereby limits the end play of the assembly to the desired tolerance.

Although the seals 23 have been illustrated in FIGURE 2 as being bonded to the ends of the cups 17 and 18, it is to be noted that the seals may be separate elements. Referring now to FIGURE 6, it will be seen that the seals 23 may be bonded to washer-like inserts 23A in lieu of being bonded to the flanges 21. The inserts 23A extend radially beyond the seals 23 and are suitably clamped between the flanges 21 of the cups and the flanges of the sleeve 14.

It is also to be understood that the shaft may terminate within the bearing assembly. In FIGURE 7 there is illustrated a modified form of shaft 12A which has the left end thereof terminating within a bearing 11A. The bearing 11A differs from the bearing 11 only in that the sleeve is in the form of a cup 14B which in lieu of being preformed with a flange 15 at one end thereof is provided with an end wall 15A. It is to be understood that where the sleeve 14B is closed at one end, it is not necessary to provide a seal 23 at that end.

Reference is now made to FIGURE 8 wherein there is illustrated another form of bearing and shaft assembly, which assembly is generally referred to by the numeral 40. The bearing and shaft assembly 40 includes a bearing, which is generally identified by the numeral 41, and shaft 42 which is rotatably journalled in the bearing 41.

Referring now to FIGURE 9 in particular, it will be seen that the bearing 41 includes a housing 43. The housing 43 is in the form of a sleeve having a relatively thick wall.

The central portion of the shaft 42 is provided with an annular groove-like raceway 44. The internal surface of the sleeve or housing 43 is also machined to define a similar groove-like raceway 45. The raceways 44 and 45 are disposed in alignment and are so retained by rolling bearing elements 46 which are in the form of balls. The rolling bearing elements or balls 46 are retained in circumferentially spaced relation by a retainer 47. The retainer 47 is preferably formed of sheet metal and is of a C-shaped cross section having circumferentially spaced openings therein within which the balls 46 are seated.

On opposite sides of the raceway 45, the inner surface of the sleeve or housing 43 is provided with annular grooves 48 in which there are seated snap rings 50.

Axially outwardly of the snap rings 50, the inner surface of the housing 43 is machined to define a pair of cylindrical raceways 51 and 52. A second set of rolling bearing elements 53 is disposed in rolling contact with the shaft 42 and the cylindrical raceway 51. The rolling bearing elements 53 are preferably in the form of rollers which are retained in circumferentially spaced relation by means of a sheet metal retainer 54. A third set of rolling bearing elements 55 is disposed in rolling contact with the shaft 42 and the cylindrical raceway 52. Like the rolling bearing elements 53, the rolling bearing elements 55 are preferably in the form of rollers and are retained in circumferentially spaced relation by means of a sheet metal retainer 56.

The inner surface of the housing 43 has an annular groove 59 at the opposite ends thereof. Seated in the recessed ends of the housing 43 are seal assemblies 57. The two seal assemblies 57 are identical, and each seal assembly includes an inner washer 58, a seal 60, which is of the shaft riding type, and an outer washer 61. The washer 61 is concavo-convex before assembly into the groove 59 and is pressed flat at assembly engaging a flange 62 and retaining the seal 57 in place.

It is to be noted that the snap rings 50 serve to isolate the first set of rolling bearing elements 46 from the second and third sets of rolling bearing elements. At the same time, the snap rings 50 serve to cooperate with the washers 58 for positioning the retainers 54 and 56. In addition, the left one of the snap rings 50, as viewed in FIGURE 6, serves to generally retain the retainer 47 in an axial position.

In the bearing 41, the rollers 53 and 55 support the shaft 42 against the relatively heavy radial loading. The balls 46 have the function of transferring axial loadings on the shaft 42 to the housing 43.

It is to be understood that although the bearing and shaft assemblies of this disclosure are primarily designed for use in conjunction with water pumps, it is to be understood that the assembly is to be utilized in any desired environment. However, the bearing and shaft assemblies are of the type which are generally recognized in the trade as water pump bearing and shaft assemblies.

Although only two preferred embodiments of the invention have been specifically illustrated and described herein, it is to be understood that minor variations may be made in the disclosed bearing and shaft assemblies without departing from the spirit and scope of the invention, as defined by the appended claims.

What is claimed as new is:

1. A bearing and shaft assembly particularly adapted for heavy radial or couple loads accompanied by a light axial thrust load, said assembly comprising a housing, a shaft extending through said housing and bearing means disposed within said housing rotatably journalling said shaft, said bearing means including a first groove-like raceway in said shaft and an opposed second groove-like raceway within said housing, first rolling bearing elements seated in said groove-like raceways and resisting axial movement of said shaft relative to said housing while rotatably supporting said shaft within said housing, cylindrical raceways within said housing on opposite sides of said second groove-like raceway and opposing said shaft, second and third rolling bearing elements disposed between and in rolling engagement with said shaft and said cylindrical raceways on opposite sides of said first rolling bearing elements, and shaft riding seals at the opposite ends of said housing, and housing being in the form of a sleeve having a pair of cups positioned therein in opposed spaced relation, the opposed ends of said cups being contoured and cooperating with said sleeve to define said second groove-like raceway.

2. The bearing and shaft assembly of claim 1 wherein said cups have cylindrical bodies defining said cylindrical raceways.

3. A bearing and shaft assembly particularly adapted for heavy radial or couple loads accompanied by a light axial thrust load, said assembly comprising a housing, a shaft extending through said housing and bearing means disposed within said housing rotatably journalling said shaft, said bearing means including a first groove-like raceway in said shaft and an opposed second groove-like raceway within said housing, first rolling bearing elements seated in said groove-like raceways and resisting axial movement of said shaft relative to said housing while rotatably supporting said shaft within said housing, cylindrical raceways within said housing on opposite sides of said second groove-like raceway and opposing said shaft, second and third rolling bearing elements disposed between and in rolling engagement with said shaft and said cylindrical raceways on opposite sides of said first rolling bearing elements, and shaft riding seals at the opposite ends of said housing, said housing being in the form of a sleeve having a pair of cups positioned therein in opposed spaced relation, the opposed ends of said cups being contoured and cooperating with said sleeve to define said second groove-like raceway, said cups being of a drawn sheet metal construction.

4. The bearing and shaft assembly of claim 3 wherein the ends of said sleeve are radially inwardly crimped to retain said cups therein.

5. A bearing and shaft assembly particularly adapted for heavy radial or couple loads accompanied by a light axial thrust load, said assembly comprising a housing, a shaft extending through said housing and bearing means disposed within said housing rotatably journalling said shaft, said bearing means including a first groove-like raceway in said shaft and an opposed second groove-like raceway within said housing, first rolling bearing elements seated in said groove-like raceways and resisting axial movement of said shaft relative to said housing while rotatably supporting said shaft within said housing, cylindrical raceways within said housing on opposite sides of said second groove-like raceway and opposing said shaft, second and third rolling bearing elements disposed between and in rolling engagement with said shaft rolling cylindrical raceways on opposite sides of said first rolling bearing elements, and shaft riding seals at the opposite ends of said housing, said housing being in the form of a sleeve having a pair of cups positioned therein in abutted relation, the opposed ends of said cups being contoured to define said second groove-like raceway, and said cups having cylindrical bodies defining said cylindrical raceways.

6. A bearing and shaft assembly particularly adapted for heavy radial or couple loads accompanied by a light axial thrust load, said assembly comprising a housing, a shaft extending through said housing and bearing means disposed between and in rolling engagement with said shaft, said bearing means including a first groove-like raceway in said shaft and an opposed second groove-like raceway within said housing, first rolling bearing elements seated in said groove-like raceways and resisting axial movement of said shaft relative to said housing while rotatably supporting said shaft within said housing, cylindrical raceways within said housing on opposite sides of said second groove-like raceway and opposing said shaft, second and third rolling bearing elements disposed between and in rolling engagement with said shaft and said cylindrical raceways on opposite sides of said first rolling bearing elements, and shaft riding seals at the opposite ends of said housing, said housing being in the form of a sleeve having a pair of cups positioned therein in abutted relation, the opposed ends of said cups being contoured to define said second groove-like raceway, said cups being of a drawn sheet metal construction.

7. The bearing and shaft assembly of claim 6 wherein said sleeve is of a drawn sheet metal construction with the ends of said sleeve being radially inwardly crimped to retain said cups therein.

8. A bearing and shaft assembly particularly adapted for heavy radial or couple loads accompanied by a light axial thrust load, said assembly comprising a generally cylindrical shaft having an inner groove-like raceway formed therein and adjacent surface portions therein defining inner cylindrical raceways; a housing disposed coaxial with said inner raceways, said housing including an outer sleeve and a pair of identical drawn sheet metal cups fixedly positioned therein in open end opposed relation, said cup opposed ends being contoured to at least in part define an outer groove-like raceway aligned with said inner groove-like raceway, and each of said cups having a major portion thereof defining an outer cylindrical raceway; and bearing elements between said shaft and said housing, said bearing elements including balls seated in said groove-like raceways and resisting relative axial movement between said shaft and said housing, and rollers disposed between and in rolling engagement with said cylindrical raceways to radially position said shaft.

References Cited

UNITED STATES PATENTS

| | | | |
|---|---|---|---|
| 1,068,017 | 7/1913 | Stuebner | 308—213 |
| 2,040,489 | 5/1936 | Large | 308—174 |
| 2,094,251 | 9/1937 | Young | 308—174 |
| 2,588,459 | 3/1952 | Annen | 308—189 |
| 2,991,133 | 7/1961 | Gregg | 308—187.2 |
| 1,304,231 | 5/1919 | Wilson | 308—187.1 |

MARTIN P. SCHWADRON, *Primary Examiner.*

FRANK SUSKO, *Assistant Examiner.*